US011719445B2

(12) United States Patent
Sinha et al.

(10) Patent No.: US 11,719,445 B2
(45) Date of Patent: Aug. 8, 2023

(54) AIR HANDLER UNIT

(71) Applicant: Carrier Corporation, Palm Beach Gardens, FL (US)

(72) Inventors: Saurabh Kumar Sinha, Telangana (IN); Prasad Babu Lakshmipathy, Telangana (IN); Harshal Chaudhari, Telangana (IN); Vinod Kumar Modugu, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 227 days.

(21) Appl. No.: 17/043,286

(22) PCT Filed: Apr. 3, 2019

(86) PCT No.: PCT/US2019/025557
§ 371 (c)(1),
(2) Date: Sep. 29, 2020

(87) PCT Pub. No.: WO2019/195402
PCT Pub. Date: Oct. 10, 2019

(65) Prior Publication Data

US 2021/0018185 A1 Jan. 21, 2021

(30) Foreign Application Priority Data

Apr. 5, 2018 (IN) ............................ 201811013081

(51) Int. Cl.
*F24F 1/0007* (2019.01)
*F24F 11/80* (2018.01)
(Continued)

(52) U.S. Cl.
CPC .............. *F24F 1/0007* (2013.01); *F24F 3/00* (2013.01); *F24F 5/0035* (2013.01); *F24F 11/70* (2018.01); *F24F 11/80* (2018.01)

(58) Field of Classification Search
CPC ........ F24F 3/052; F24F 1/0087; F24F 5/0035; F24F 3/00; F24F 11/70; F24F 11/80
See application file for complete search history.

(56) References Cited

U.S. PATENT DOCUMENTS 608,897 A 1/1906 Carrier et al.
1,471,112 A 10/1923 Ellis
(Continued)

FOREIGN PATENT DOCUMENTS

CN 104329739 A * 2/2015 ............. F24F 11/89
CN 105387540 A 3/2016
(Continued)

OTHER PUBLICATIONS

CN104329739A Translation (Year: 2015).*
(Continued)

*Primary Examiner* — Schyler S Sanks
(74) *Attorney, Agent, or Firm* — Cantor Colburn LLP

(57) ABSTRACT

An air handling unit (AHU) system is provided and includes an AHU. The AHU includes an enclosure formed to define an inlet and at least one outlet downstream from the inlet, an air supply system to drive an air flow through the enclosure from the inlet to the outlet and a misting system operably coupled to the AHU. The misting system is configured to spray high pressure, cold water mist that includes mist droplets into a portion of the enclosure upstream from the at least one outlet whereupon heat transfer occurs directly between the mist droplets and air prior to the air reaching the outlet.

6 Claims, 2 Drawing Sheets

(51) Int. Cl.

| | |
|---|---|
| ***F24F 11/70*** | (2018.01) |
| ***F24F 3/00*** | (2006.01) |
| ***F24F 5/00*** | (2006.01) |

(56) References Cited

U.S. PATENT DOCUMENTS

| | | | | |
|---|---|---|---|---|
| 1,533,859 | A | 4/1925 | Hodge | |
| 2,142,289 | A | 1/1939 | Sloan | |
| 2,835,476 | A | 5/1958 | Kohut, Jr. | |
| 2,953,355 | A | 9/1960 | Hungate | |
| 4,142,575 | A | 3/1979 | Glancy | |
| 4,429,735 | A | 2/1984 | Nomaguchi et al. | |
| 4,627,568 | A | 12/1986 | Lortie et al. | |
| 4,643,744 | A | 2/1987 | Brooks | |
| 4,771,611 | A | 9/1988 | McNab | |
| 6,141,986 | A | 11/2000 | Koplin | |
| 6,595,011 | B1 | 7/2003 | Forgy | |
| 6,694,757 | B1 | 2/2004 | Backman | |
| 9,278,303 | B1 | 3/2016 | Somani et al. | |
| 9,445,531 | B1 | 9/2016 | Heydari | |
| 2002/0020185 | A1 * | 2/2002 | Carr | B60H 1/32331 62/434 |
| 2005/0086967 | A1 | 4/2005 | Pavlik | |
| 2009/0283606 | A1 * | 11/2009 | Terrell | F24F 5/0035 239/320 |
| 2015/0323213 | A1 * | 11/2015 | Rohde | F24F 11/30 165/280 |
| 2017/0128611 | A1 * | 5/2017 | Prax | F24F 8/50 |

FOREIGN PATENT DOCUMENTS

| | | | |
|---|---|---|---|
| CN | 104329739 | B | 2/2017 |
| CN | 106403091 | A | 2/2017 |
| CN | 106413848 | A | 2/2017 |
| GB | 1474732 | A | 5/1977 |
| JP | S61256125 | A | 11/1986 |
| JP | 2014190672 | A | 10/2014 |
| WO | 9004138 | A1 | 4/1990 |
| WO | 9010828 | A1 | 9/1990 |
| WO | 9310404 | A1 | 5/1993 |
| WO | 9522726 | A2 | 8/1995 |
| WO | 03016789 | A1 | 2/2003 |

OTHER PUBLICATIONS http://www.marioff.com/water-mist/marioff-is-a-global-leader-and-innovator-of-high-pressure-water-mist-fire-protection; printed Sep. 22, 2020; pp. 1.

International Serach Report and Written Opinion Application No. PCT/US2019/025557; dated Jun. 24, 2019; pp. 6.

Search Report issued in European Patent Application No. 19717722.3; Application filed Apr. 3, 2019; dated Mar. 9, 2023 (8 pages).

* cited by examiner

AIR HANDLER UNIT

CROSS-REFERENCE TO RELATED APPLICATIONS

This application is a National Phase of PCT Application No. PCT/US2019/025557 filed Apr. 3, 2019, which claims the benefit of Indian Application No. 201811013081 filed Apr. 5, 2018, the disclosure of which is incorporated herein by reference in its entirety.

BACKGROUND

The following description relates to air handler units (AHUs) and, more specifically, to an advanced AHU with multi-staged high pressure cold water mist.

In traditional heating, ventilation and air-conditioning (HVAC) systems, application side air is cooled when it passes over chilled cooling coils. The heat transfer does not take place directly, however, and instead proceeds from air (supplied and return air) to the metal coils and in turn from the metal coils to cold water. This tends to slow the heat transfer processes and results in decreased output and degraded performance.

BRIEF DESCRIPTION

According to an aspect of the disclosure, an air handling unit (AHU) system is provided and includes an AHU. The AHU includes an enclosure formed to define an inlet and at least one outlet downstream from the inlet, an air supply system to drive an air flow through the enclosure from the inlet to the outlet and a misting system operably coupled to the AHU. The misting system is configured to spray high pressure, cold water mist that includes mist droplets into a portion of the enclosure upstream from the at least one outlet whereupon heat transfer occurs directly between the mist droplets and air prior to the air reaching the outlet.

In accordance with additional or alternative embodiments, the misting system generates about $1.9\times10^9$ to $1.9\times10^{12}$ mist droplets from 1 liter of water. In accordance with additional or alternative embodiments, the mist droplets range from about 0.1 to about 0.01 mm in diameter.

In accordance with additional or alternative embodiments, a mixed air chamber is upstream from the inlet.

In accordance with additional or alternative embodiments, wherein the at least one outlet includes a first outlet section, a second outlet section, a baffle interposed between the first and second outlet sections and a downstream control element configured to modulate relative sizes of flows along the first and second outlet sections.

In accordance with additional or alternative embodiments, the first outlet section includes a cooling coil, a blower, a heating coil interposed between the cooling coil and the blower and at least one filter.

In accordance with additional or alternative embodiments, the second outlet section includes a secondary nozzle, a blower, a heating coil interposed between the secondary nozzle and the blower and at least one filter.

In accordance with additional or alternative embodiments, the air supply system includes a return air supply conduit operably coupled to the inlet and configured to direct conditioned air to the inlet, a fresh air supply opening disposed adjacent to the inlet and configured to allow fresh air to flow through the inlet and an upstream control element configured to modulate relative amounts of the conditioned and fresh air in the inlet.

In accordance with additional or alternative embodiments, the misting system includes a mist supply system configured to supply water to the misting system and a drainage system configured to drain water from the enclosure, and the mist supply system includes at least one filter, a high pressure pump downstream from the at least one filter, at least one nozzle and a controllable valve interposed between the high pressure pump and the nozzle.

In accordance with additional or alternative embodiments, an evaporator is communicative with the mist supply system and the drainage system.

In accordance with additional or alternative embodiments, a fluid pressure at the at least one nozzle is at least about 500 PSI.

According to an aspect of the disclosure, a method of operating an air handling unit (AHU) system of a heating, ventilation and air-conditioning (HVAC) system is provided. The method includes driving an air flow through an enclosure upstream from field ductwork of the HVAC system, spraying a high pressure, cold water mist including mist droplets into the enclosure whereupon heat transfer occurs directly between the mist droplets and air and controlling a size and a quantity of the mist droplets and a volume in which the mist droplets are spread in accordance with a quantity of the air driven through the enclosure.

According to an aspect of the disclosure, a heating, ventilating and air-conditioning (HVAC) system is provided. The HVAC system includes an evaporator, field ductwork and an air handling unit (AHU) system that includes an AHU. The AHU includes an enclosure, an air supply system, a misting system and air conditioning elements. The enclosure is formed to define an inlet and at least one outlet, which is downstream from the inlet and which is communicative with the field ductwork. The air supply system drives return air from the field ductwork and fresh air through the enclosure from the inlet to the outlet. The misting system is configured to spray a high pressure, cold water mist, including mist droplets, generated from water received from the evaporator into a portion of the enclosure upstream from the at least one outlet whereupon heat transfer occurs directly between the mist droplets and air prior to the air reaching the at least one outlet, and to return water drained from the enclosure to the evaporator. The air conditioning elements are operably disposed in the at least one outlet to condition the air upstream from the field ductwork.

In accordance with additional or alternative embodiments, the misting system generates about $1.9\times10^9$ to $1.9\times10^{12}$ mist droplets from 1 liter of water And the mist droplets range from about 0.1 to about 0.01 mm in diameter.

In accordance with additional or alternative embodiments, a controller is configured to at least adjust sizes of the mist droplets and a volume in which the mist droplets are spread.

In accordance with additional or alternative embodiments, the at least one outlet includes a first outlet section, a second outlet section, a baffle interposed between the first and second outlet sections and a downstream control element configured to modulate relative sizes of flows along the first and second outlet sections.

In accordance with additional or alternative embodiments, air conditioning elements in the first outlet section include a cooling coil, a blower, a heating coil interposed between the cooling coil and the blower and at least one filter and air conditioning elements in the second outlet section include a secondary nozzle, a blower, a heating coil interposed between the secondary nozzle and the blower and at least one filter.

In accordance with additional or alternative embodiments, the air supply system includes a return air supply conduit operably coupled to the inlet and configured to direct conditioned air from the field ductwork to the inlet, a fresh air supply opening disposed adjacent to the inlet and configured to allow fresh air to flow through the inlet and an upstream control element configured to modulate relative amounts of the conditioned and fresh air in the inlet.

In accordance with additional or alternative embodiments, the misting system includes a mist supply system configured to supply water to the misting system and a drainage system configured to drain the water from the enclosure, and the mist supply system includes at least one filter, a high pressure pump downstream from the at least one filter, at least one nozzle and a controllable valve interposed between the high pressure pump and the nozzle.

In accordance with additional or alternative embodiments, a fluid pressure at the nozzle is at least about 500 PSI.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, high pressure cold water mist is used in an air handling unit (AHU) of a heating, ventilation and air-conditioning (HVAC) system to achieve efficient and nearly cooling of air flows. The high pressure cold water mist is mixed with air flows in an air chamber and result in direct heat transfer between the mist and the air flows.

Figure 1:
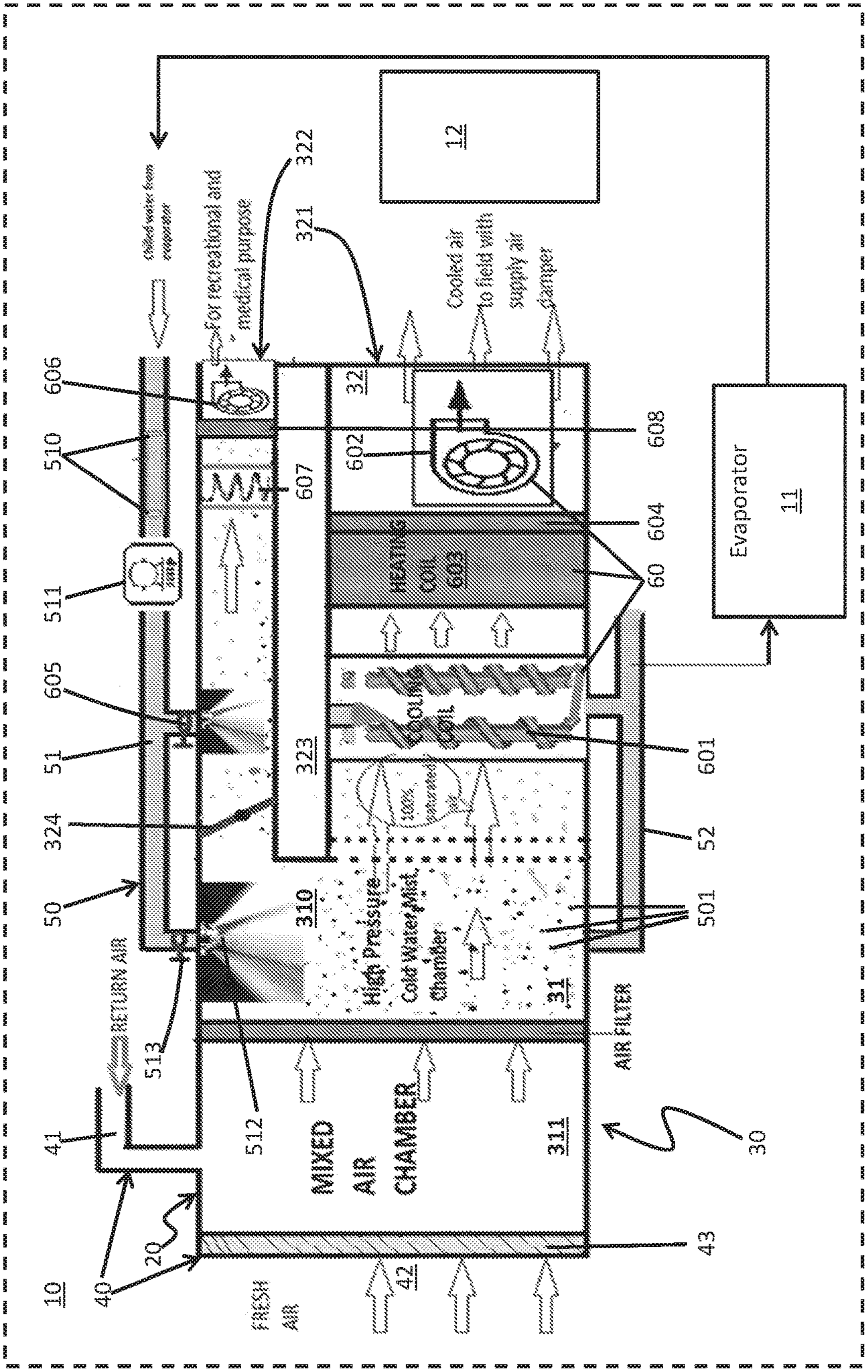
FIG. 1 is a side schematic view of an air handling unit (AHU) system of a heating, ventilation and air conditioning (HVAC) system in accordance with further embodiments.

With reference to FIG. 1, a portion of a heating, ventilating and air-conditioning (HVAC) system 10 is provided and includes an evaporator 11, which is a component of a vapor-cycle machine of the HVAC system 10, field ductwork 12 and an AHU 20. The field ductwork 12 may be installed through a structure so that conditioned air can be delivered to and drawn from various spaces within the structure.

The AHU 20 includes an enclosure 30, which is formed to define an inlet 31 and at least one outlet 32. The at least one outlet 32 is downstream from the inlet 31 and fluidly communicative with the field ductwork 12. The AHU 20 further includes a misting system 50 and air conditioning elements 60. An air supply system 40 is operably coupled to the AHU 20, and is configured to drive return air from the field ductwork 12 and fresh air through the enclosure 30 from the inlet 31 to the at least one outlet 32.

The misting system 50 is configured to spray a high pressure, cold water mist that includes mist droplets 501 which are generated from water received from the evaporator 11 into a portion 310 of the enclosure 30 that is proximate to the inlet 31 and upstream from the at least one outlet 32 whereupon heat transfer occurs directly between mist droplets 501 and air prior to the air reaching the at least one outlet 32. The misting system 50 is further configured to return water drained from the enclosure 30 to the evaporator 11 (it is to be understood that drainage can be accomplished by the misting system 50 or by another suitable drainage system and that the description herein is merely exemplary). The air conditioning elements 60 are operably disposed in the enclosure 30, or more particularly, in the at least one outlet 32, to condition the air upstream from the field ductwork 12.

The misting system 50 may include a mist supply system 51 configured to supply water to the misting system 50. Where the misting system 50 is responsible for drainage, the misting system 50 may also include a drainage system 52 that is configured to drain water from the enclosure 30. The mist supply system 51 may include: one or more filters 510 (e.g. ultraviolet (UV) and water filters) to prevent bacterial formation and growth therein, a high pressure pump 511 disposed downstream from the one or more filters 510, at least one nozzle 512, and at least one controllable valve 513 (with secondary nozzle 605 to be discussed below) that is fluidly interposed between the high pressure pump 511 and the at least one nozzle 512.

In accordance with embodiments, the misting system 50 is configured to generate about $1.9 \times 10^9$ to $1.9 \times 10^{12}$ mist droplets 501 from 1 liter of water. The mist droplets 501 can range from about 0.1 to about 0.01 mm in diameter or less in some cases. In addition, a fluid pressure at the at least one nozzle 512 can be at least about 500 PSI.

Figure 2:
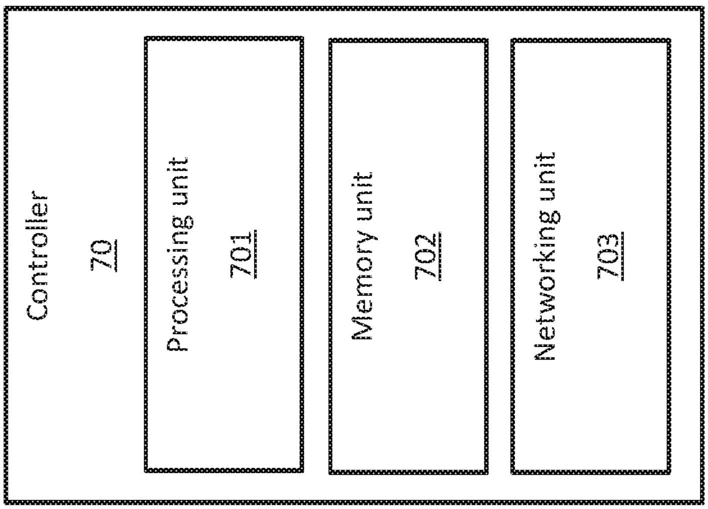
FIG. 2 is a schematic diagram of a controller of the AHU of FIG. 1.

With reference to FIG. 2, the AHU 20 (or the HVAC 10 as a whole) may further include a controller 70. The controller 70 includes a processing unit 701, a memory unit 702 and a networking unit 703 by which the processing unit 701 is communicative with at least the misting system 50 (see FIG. 1) and, in some cases, with the air supply system 40 and the air conditioning elements 60 (see FIG. 1). The memory unit 702 has executable instructions stored thereon which are readable and executable by the processing unit 701. When the executable instructions are read and executed by the processing unit 701, the executable instructions cause the processing unit 701 to at least control or adjust the sizes of the mist droplets 501 by either increasing fluid pressures within the misting system 50 or by increasing an amount of fluid within the misting system 50 and/or to control a volume of the enclosure 30 in which the mist droplets 501 are spread. Such control may be based on or in accordance with a quantity of air received in the inlet 31 (or the mixed air chamber 331 discussed below).

With reference back to FIG. 1, the inlet 31 may include or be provided as mixed air chamber 311 that is defined upstream from the portion 310 of the enclosure 30 into which the high pressure, cold water mist is sprayed by the misting system 50. The at least one outlet 32 may include or be provided as a first outlet section 321 defined downstream from the portion 310 of the enclosure 30. A second outlet section 322, also downstream from the portion 310 of the enclosure 30, is disposed in parallel with the first outlet 321. A baffle 323 is interposed between the first and second outlets 321 and 322. A downstream control element 324 may include or be provided as a damper or a valve and may be disposable in the second outlet section 322. The downstream control element 324 is configured to modulate relative sizes of flows or air permitted to flow through the first and second outlet sections 321 and 322.

The air conditioning elements 60 disposed in or upstream of the first outlet section 321 and may include: a cooling coil 601, a blower 602, a heating coil 603 that is interposed between the cooling coil 601 and the blower 602, and one or more filters 604 adjacent to the heating coil 603 and the blower 602. The filters 604 may include or be provided as carbon/microbial air filters. The air conditioning elements 60 disposed in or upstream of the second outlet section 322 may include: a secondary nozzle 605, a blower 606, a heating coil 607 interposed between the secondary nozzle 605 and the blower 606, and one or more filters 608. The filters 608 may be provided at or adjacent to the heating coil 607 and the blower 606 and may include or be provided as carbon/microbial air filters.

In accordance with embodiments, air flows exiting the second outlet 322 can be employed in various applications including, but not limited to, pharmaceutical, medical, recreational, etc. applications.

The air supply system 40 may include a return air supply conduit 41, a fresh air supply opening 42 and an upstream control element 43. The return air supply conduit 41 may be configured to allow conditioned air from the field ductwork 12 to enter the mixed air chamber 311 and/or the inlet 31. The fresh air supply opening 42 may be configured to allow fresh air to enter the mixed air chamber 311 and/or the inlet 31. The upstream control element 43 may include or be provided as a damper or a valve that is disposable along the fresh air supply opening 42 and which is configured to modulate relative amounts of the fresh air in the mixed air chamber 311 and the inlet 31.

Figure 3:
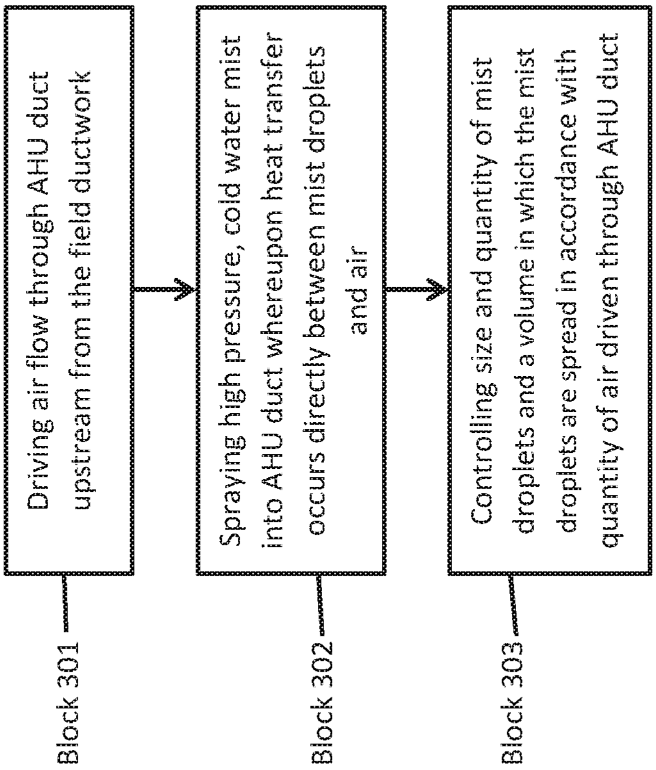
FIG. 3 is a flow diagram illustrating a method of operating an air handling unit (AHU) of a heating, ventilation and air conditioning (HVAC) system in accordance with further embodiments.

With reference to FIG. 3, a method of operating the AHU 20 described herein is provided. The method includes driving an air flow through the enclosure 30 upstream from the field ductwork 12 (block 301), spraying a high pressure, cold water mist into the enclosure 30 whereupon heat transfer occurs directly between mist droplets 501 and air (block 302) and controlling a size and a quantity of the mist droplets 501 and a volume of the enclosure 30 in which the mist droplets 501 are spread in accordance with a quantity of the air driven through the enclosure 30 (block 303).

When homogenous or mixed air flows proceed through the mist droplets 501 of the high pressure, cold water mist provided by the misting system 50, the air eventually transforms into fully saturated air within the inlet 31. The mist droplets 501 will thus absorb heat from the passing air in a direct heat transfer process while the fully saturated air passes into and through at least one of the first and second outlets 321 and 322. Within the first outlet, for example, the fully saturated air passes over or through the cooling coil 601 to accomplish a secondary cooling and also to removes excess moisture content. The cold air is passed over or through the heating coil 603 to achieve a required supply air temperature for the HVAC system 10 and to provide for humidity control as well. Condensed water can be extracted by the drainage system 52 and may be passed through one or more semi-permeable membranes before being fed back to the evaporator 11.

Benefits of the features described herein are improved heat transfer and efficiency as compared to traditional AHU systems owing to the addition of high pressure cold water mist to air flows so that heat transfer between the air flows and the mist occurs directly.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A heating, ventilating and air-conditioning (HVAC) system, comprising:
- an evaporator;
- field ductwork; and
- an air handling unit (AHU) system, comprising:
- an AHU comprising:
- an enclosure formed to define an inlet and at least one outlet, which is downstream from the inlet and which is communicative with the field ductwork, wherein the at least one outlet comprises a first outlet section, a second outlet section, a baffle interposed between the first and second outlet sections and a downstream control element configured to modulate relative sizes of flows along the first and second outlet sections;
- an air supply system to drive return air from the field ductwork and fresh air through the enclosure from the inlet to the outlet;
- a misting system configured to:
  - spray a pressurized, water mist, comprising mist droplets, generated from water received from the evaporator into a portion of the enclosure upstream from the at least one outlet whereupon heat transfer occurs directly between the mist droplets and air prior to the air reaching the at least one outlet, and
  - return water drained from the enclosure to the evaporator; and
- air conditioning elements operably disposed in the at least one outlet to condition the air upstream from the field ductwork,
- wherein:
- air conditioning elements in the first outlet section comprise a cooling coil, a blower, a heating coil interposed between the cooling coil and the blower and at least one filter, and
- air conditioning elements in the second outlet section comprise a secondary nozzle, a blower, a heating coil interposed between the secondary nozzle and the blower and at least one filter.

2. The HVAC system according to claim 1, wherein:
- the misting system generates $1.9\times10^{9}$ to $1.9\times10^{12}$ mist droplets from 1 liter of water, and
- the mist droplets range from 0.1 to about 0.01 mm in diameter.

3. The HVAC system according to claim 1, further comprising a controller configured to at least adjust sizes of the mist droplets and a volume in which the mist droplets are spread.

4. The HVAC system according to claim 1, wherein the air supply system comprises:
- a return air supply conduit operably coupled to the inlet and configured to direct conditioned air from the field ductwork to the inlet;

a fresh air supply opening disposed adjacent to the inlet and configured to allow fresh air to flow through the inlet; and an upstream control element configured to modulate relative amounts of the conditioned and fresh air in the inlet.

5. The HVAC system according to claim 1, wherein:

the misting system comprises a mist supply system configured to supply water to the misting system and a drainage system configured to drain the water from the enclosure, and wherein the mist supply system comprises at least one filter, a pump downstream from the at least one filter, at least one nozzle and a controllable valve interposed between the pump and the nozzle.

6. The HVAC system according to claim 5, wherein a fluid pressure at the nozzle is at least 500 PSI.

* * * * *